Jan. 10, 1933.   H. T. DARLINGTON   1,893,667
APPARATUS FOR TREATING HYDROCARBON AND OTHER GASES AND OILS
Filed April 25, 1927   2 Sheets-Sheet 2
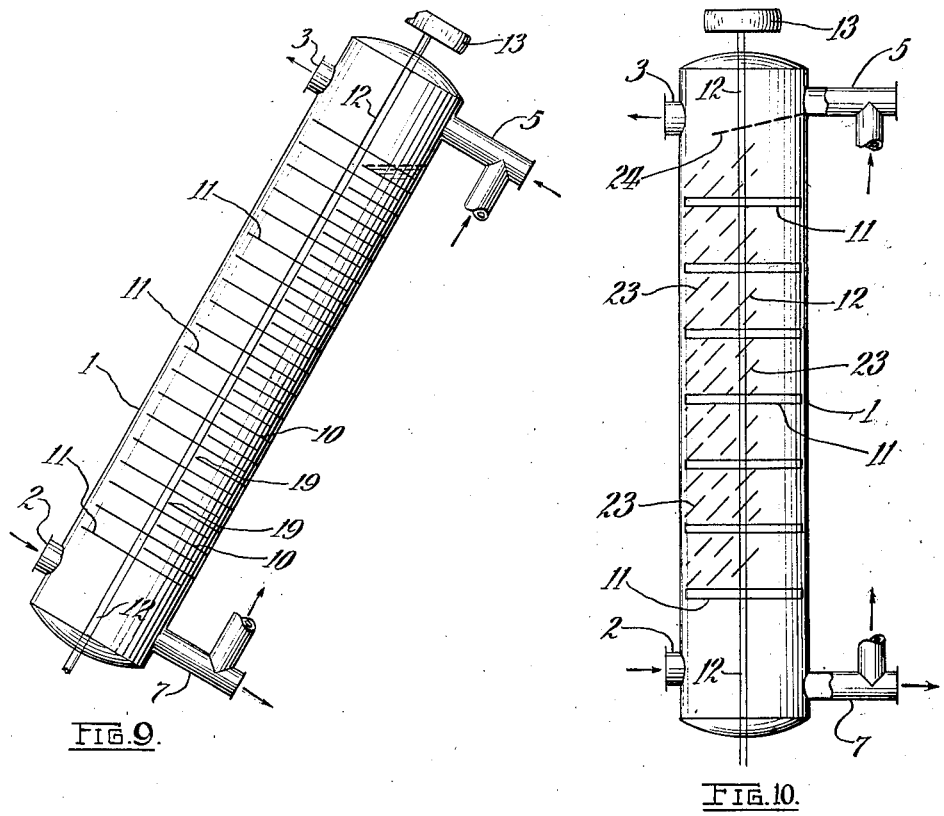
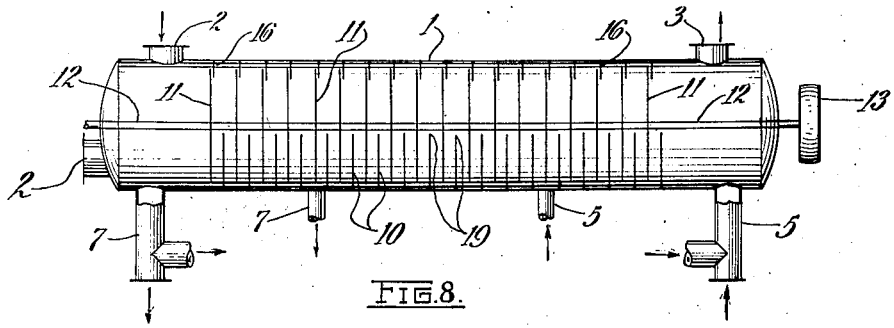
INVENTOR.
Homer T. Darlington,
BY
ATTORNEY.

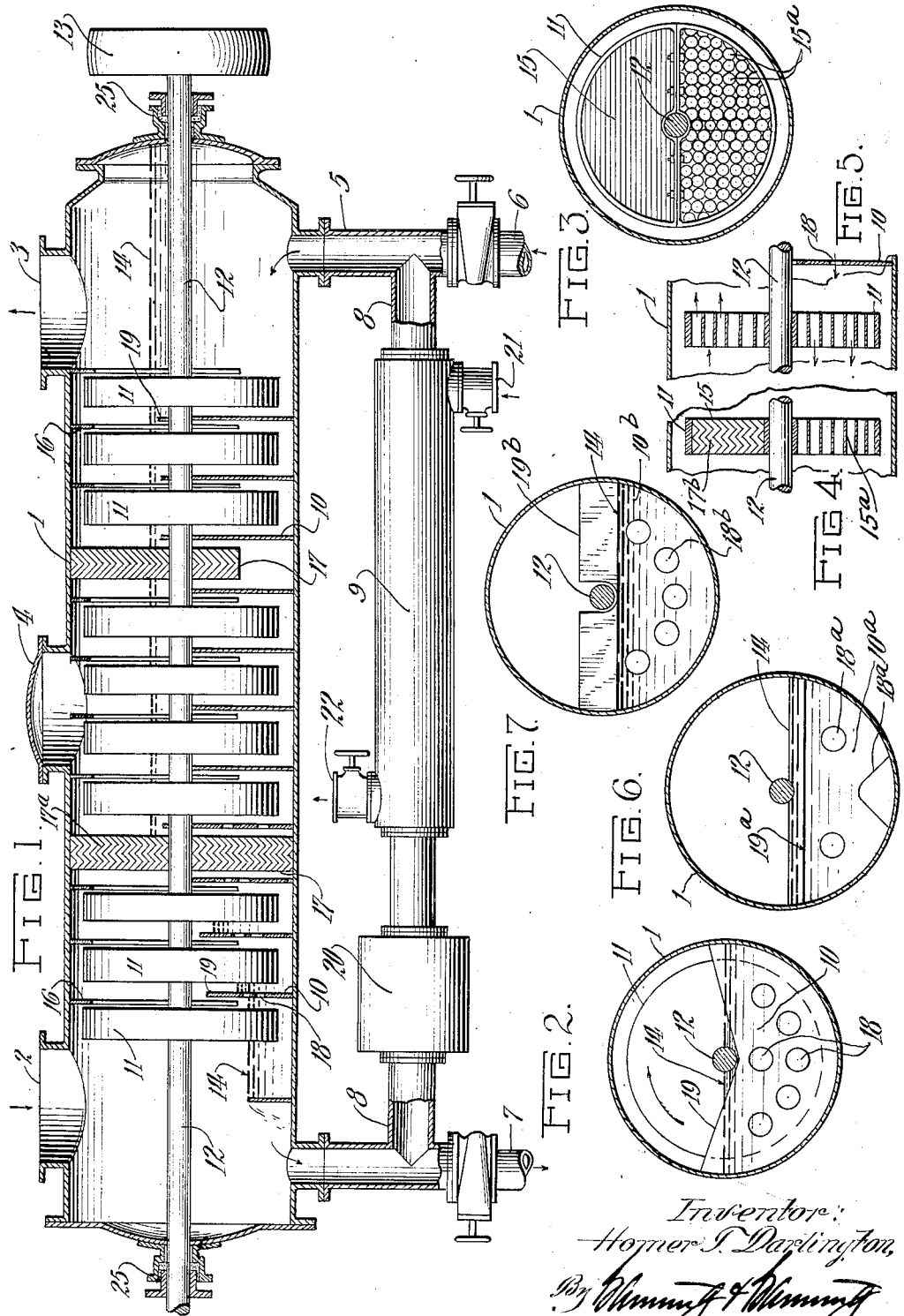

Patented Jan. 10, 1933

1,893,667

UNITED STATES PATENT OFFICE

HOMER T. DARLINGTON, OF WEST CHESTER, PENNSYLVANIA, ASSIGNOR, BY MESNE ASSIGNMENTS, TO OIL CORPORATION OF AMERICA, A CORPORATION OF DELAWARE

APPARATUS FOR TREATING HYDROCARBON AND OTHER GASES AND OILS

Application filed April 25, 1927  Serial No. 186,459.

My process which is new and distinctive provides for the treatment of the products of the distillation or cracking, or both, of hydrocarbons and the incidental treatment of cooling oil and condensate, in an elongated chamber placed either horizontally or perpendicularly, or at any angle from the horizontal to the perpendicular, as may be preferred, which chamber is so constructed or arranged that the cooling liquid or medium, which may be crude petroleum oil, shall occupy one part longitudinally of the elongated chamber and the vapors or gases resulting from distillation or cracking, or both, shall occupy the other part longitudinally of the chamber, and while they may be in surface contact shall not intermingle except as herein set forth. In practice I admit the vapors or gas to the chamber at or near one end and admit the cooling liquid at or near the other end and pass them through practically the entire length of the chamber in counter current, or I may, if desired, admit both vapor or gas and cooling liquid separately at the same end of the chamber and pass them through it independently and concurrently.

By passing the vapor or gas and cooling liquid through the chamber in this manner, I may maintain such pressure as is desired, and regulate temperature in the chamber, thus dephlegmating under regulated pressure and temperature, as has not heretofore been done, and doing it more adequately, efficiently and speedily.

To aid in treating the vapors and gases, and at the same time remove moisture or mist from the vapor or gas being treated, I provide baffles to impede and distort the flow of such vapor or gas, and in any practical manner, but usually and preferably by means of revolving discs partly submerged in the cooling liquid, I agitate the vapor or gas and sprinkle, spray or dash particles of the cooling liquid against and into the gas, and transfer heat from the vapor or gas to the cooling liquid. In this manner I not only speedily and efficiently cool the vapor or gas and heat the liquid used as a cooling medium, both of which are purposes of my invention, but I also extract moisture from the vapor or gas, aid in condensing higher boiling point products and intimately intermingle said moisture and higher boiling point products with the cooling medium, and where it is a crude or other heavy petroleum oil, cause the absorption in it, either in whole or in part, of said moisture and higher boiling point products.

When sulphur or objectionable color or odors are present in the gas or vapor, I add to the cooling liquid, then usually a heavy or crude petroleum oil, any suitable treating agent, such as lime, caustic soda, soda ash, water, fuller's earth, or bentonite, or a combination of one or more of these, and then the treatment described, in addition to the effects already mentioned, clarifies the products and eliminates the objectionable sulphur, color and odor, either wholly or to a degree sufficient for commercial purposes, and heavy or crude oil when used as a cooling medium, is made into a product well adapted for transformation by simple and well known processes into a very efficient lubricating oil, or used as charging stock in cracking operation with or without the intervening removal of entrained solids.

In this manner, I may remove from or change in crude or other oils that portion thereof that unduly deposits carbon, in cracking, on the apparatus. My process is continuous. Gas or vapor and cooling medium are renewed or added to as often as desired or continuously and the treatment agent when used may be added or withdrawn whenever and as often as desired.

Other characteristics and further advantages of my process appear in the description of an apparatus I have invented particularly adapted to it, and in the several claims which follow.

In the drawings:

Figure 1 is a longitudinal sectional view of the apparatus showing the rotating discs in elevation;

Fig. 2 is a cross sectional view showing one form of a weir or dam in elevation;

Fig. 3 is a cross sectional view of the apparatus showing one form of disc in elevation;

Fig. 4 is a sectional detail of the disc of Fig. 3;

Fig. 5 is a sectional detail of a modified form of disc;

Figs. 6 and 7 are cross sectional views of the apparatus showing weirs of modified construction;

Fig. 8 is a diagrammatic view of the apparatus of Fig. 1; and

Figs. 9 and 10 are diagrammatic views showing modifications of said apparatus.

My apparatus consists of a chamber through which by suitable openings a liquid and gas enter at different temperatures and move counter current to each other while passing progressively through openings in a plurality of revolving metallic discs arranged concentrically on a revolving shaft whereby heat from the liquid is transferred to the discs and from the discs to the gas—or heat is transferred from the gas to the discs and from the discs to the liquid; or a liquid may be passed concurrently with a gas through the apparatus.

The liquid may contain lime, caustic soda, soda ash, fuller's earth, hydrated lime, or bentonite herein called treating agents, to alter the character of the liquid or vapor in the dephlegmator, for instance, by absorption of sulphur or coloring matter. This liquid is continually lifted as a film wetting the discs and may be used for altering the character of the gas by exposure thereto and by renewal for treatment by revolving the discs.

Figure 1 shows one arrangement of my apparatus and its application to oil stills as a separator of liquids heavier than gasoline out of vapors from a cracking still while operating under, for instance, 600 pounds pressure. However, it may be operated at lower or normal pressure, or higher pressure. A cylindrical chamber of steel is employed with an entrance port for hot vapors at 2, and an exit port for the vapors not condensed or absorbed at 3. A means of entrance for inspection and repair may be provided in the form of a port 4. Liquid oil produced in the apparatus by condensation or brought to it by a pipe 6, may be introduced through an intake 5, and withdrawn through an outlet 7, or returned through a pipe line 8 by a pump 20, being cooled during recirculation by water or other means entering the water jacket 9 at 21 leaving at 22.

Weirs represented in Figs. 2, 6 and 7, respectively, by 10 10ª and 10ᵇ of whichever type may be preferred may be interposed along the lower side of the chamber, if desired, to insure pools of liquid into which perforated rotating discs 11 dip and which also act as protectors to prevent undue convection currents in the liquid, and gas lift effect, from rapidly overpassing gas. The chamber 1 may be horizontal as in Fig. 8, or vertical as in Fig. 10, or at an angle between, as in Fig. 9, but any angle sufficient to permit a flow of liquid from one end to the other in a suitable manner is satisfactory. Horizontal or nearly horizontal operation is very satisfactory. In the arrangement of Fig. 10, angular baffles 23 with openings are provided for the return downward on the baffle side of oil and for the passage upward on the opposite side of gas. A means 24 is provided for diverting incoming cooling oil.

12 is a shaft with suitable means of variable rotation provided by passing through stuffing boxes 25 and driven by means of a pulley 13. The discs 11 are concentrically fastened to the shaft and revolve between the weirs 10 dipping through the surface of liquid 14. The passage of gas through the passages in the discs 11 may be furthered by oppositely disposed baffles 16 which retard the passage. The perforations of the discs 11 may be of such character, as indicated in Fig. 5, that a large amount of surface in proportion to weight is presented for heating and cooling; or the perforations may be so formed or arranged tortuously as to give free passage to gas and to catch mists and entrained particles.

For the further purpose of removing mists I also may interpose stationary discs 17 or parts of discs with zigzag or tortuous or sharply diverted passages, if desired, between the revolving perforated discs 11. The stationary discs 17 may be provided with strips 17ª of corrugated metal arranged in zigzag or other tortuous relation so as to impede the flow therethrough. The same result may be attained by grouping short opened-ended tubes or the like in parallel relation to the shaft 12. Various arrangements of the rotating discs are shown in Figs. 3, 4 and 5 in which 15 indicates corrugated metal strips forming zigzag passages as at the top of Figs. 3 and 4, and 15ª represents short parallel tube sections as at the bottom of Figs. 3 and 4 and throughout the entire extent of the disc of Fig. 5, but any other arrangement affording passage to gas presenting a large metallic surface is suitable.

By thus constructing my apparatus I can use it for dephlegmator or bubble tower on oil cracking or other apparatus. I can take advantage of structural metals, such as high chromium or other steels resistant to corrosion, that are not now economically available for less efficient bubble towers and dephlegmators, which require more metal for construction in proportion to effectiveness and capacity.

I normally rotate the shaft 12 at a rate below that at which the perforated discs 11 will throw oil upwards—however, if desired, I can take advantage of the spraying effect of higher rates of revolution of shaft 12 and the heat transfer effect of liquid thrown through gas. Operating at lower rates of revolution, I find I am able to cool and handle greater volumes of gas than could be handled at higher speeds. Since the spray formed by the rapid rotation of the discs 11 would be carried concurrently with the gas, I have provided tortuous passages through stationary eliminators at intervals as represented by 17 to prevent the removal, as a mist or spray, of the liquid from the chamber 1. In Fig. 10, 24 is a deflector to insure liquid delivery to one side of the vertical dephlegmator from which it is separated from the ascending gas by deflecting perforated plates 23. Figs. 2, 6, and 7 show the baffles or weirs 10, 10$^a$ and 10$^b$, respectively wholly or partly immersed in liquid whose surface is 14. The tops of the weirs or baffles are represented respectively at 19, 19$^a$ and 19$^b$ and the optional holes through the same which may be of various shapes and sizes are respectively 18, 18$^a$ and 18$^b$, although the weirs may be imperforate if desired.

In operation the rotation of the shaft with the perforated discs carried thereby will cause a dashing up of the liquid hydrocarbon into the space through which the vapors are passing, thus effecting an intimate commingling of the fine liquid particles with the vapors which assists in an interchange of heat and also in the condensation of the more condensible vapors. At the same time the formation of the discs is such that as to afford a large surface exposure to the tortuously directed gases so that the exchange of heat is facilitated, and the separation of condensible gases promoted.

I claim:

1. In a dephlegmator, a chamber provided with an inlet for condensible vapors and gases, and an outlet for incondensible gases, an inlet and an outlet for liquid, discs in the chamber between said inlets and outlets provided with surfaces forming passages extending in angular relation to the line of flow of the gases and adapted to permit the gases to pass and be relieved of mist, said passages being configured to afford an extended surface exposure for the interchange of heat, and means for rotating the discs.

2. A dephlegmator having formed therein a section for the passage of vapors and gases and provided with mist eliminating stationary partitions interposed in said gas passageway and provided with passages configured to sharply divert the flow of the gas therethrough and thereby eliminate the mist therefrom, and having rotating discs located intermediate the stationary partitions, each of said discs being provided with passageways affording greater surface exposure than the lateral surface of the discs, means for rotating the discs, an inlet for vapors and gas, an outlet for incondensible gases, a liquid inlet, and a liquid outlet, the flow of liquid being opposite to the flow of the gas.

3. An apparatus for the treatment of hydrocarbon vapors including an elongated horizontally disposed chamber having an inlet at one end and an outlet at the other for the ingress and egress of vapors and gases, said chamber having a series of weirs arranged along the bottom to provide means for retaining a liquid therein but permitting the passage of vapors thereover, means for supplying a liquid to one end of the chamber and for receiving it from the other end, and perforate members adapted to revolve through said liquid so as to carry their wetted perforate surfaces into the path of said vapors to cause the gases to come into contact with the liquid.

4. An apparatus for the treatment of hydrocarbon vapors including an elongated horizontally disposed chamber having an inlet at one end and an outlet at the other for the ingress and egress of vapors and gases, said chamber having a series of weirs arranged along the bottom to provide means for retaining a liquid therein but permitting the passage of vapors thereover, means for supplying a liquid to one end of the chamber and for receiving it from the other end, perforate members adapted to rotate through said liquid so as to carry their wetted perforate surfaces into the path of said vapors to cause the gases to pass therethrough, the vapors passing through the chamber in the opposite direction from the liquid, and means for rotating said perforate members.

5. An apparatus for the treatment of hydrocarbon vapors including an elongated horizontally disposed chamber having an inlet at one end and an outlet at the other for the ingress and egress of vapors and gases, said chamber having a series of weirs arranged along the bottom to provide means for retaining a liquid therein but permitting the passage of vapors thereover, means for supplying a liquid to one end of the chamber and for receiving it from the other end, perforate members adapted to revolve through said liquid so as to carry their wetted perforate surfaces into the path of said vapors to cause the gases to pass therethrough, means in the path of said vapors for removing mist therefrom, and means for rotating said perforate members.

6. An apparatus for the treatment of hydrocarbon vapors including an elongated horizontally disposed chamber having an inlet at one end and an outlet at the other for the ingress and egress of vapors and gases, said chamber having a series of weirs arranged along the bottom to provide means for retaining a liquid therein but permitting the passage of vapors thereover, means for supplying a liquid to one end of the chamber and for receiving it from the other end, perforate members adapted to revolve through said liquid so as to carry their wetted perforate surfaces into the path of said vapors to cause the gases to pass therethrough, a series of corrugated vanes in the path of said vapors and between certain of said perforate members for removing mist therefrom, and means for rotating said perforate members.

HOMER T. DARLINGTON.